Patented May 2, 1933

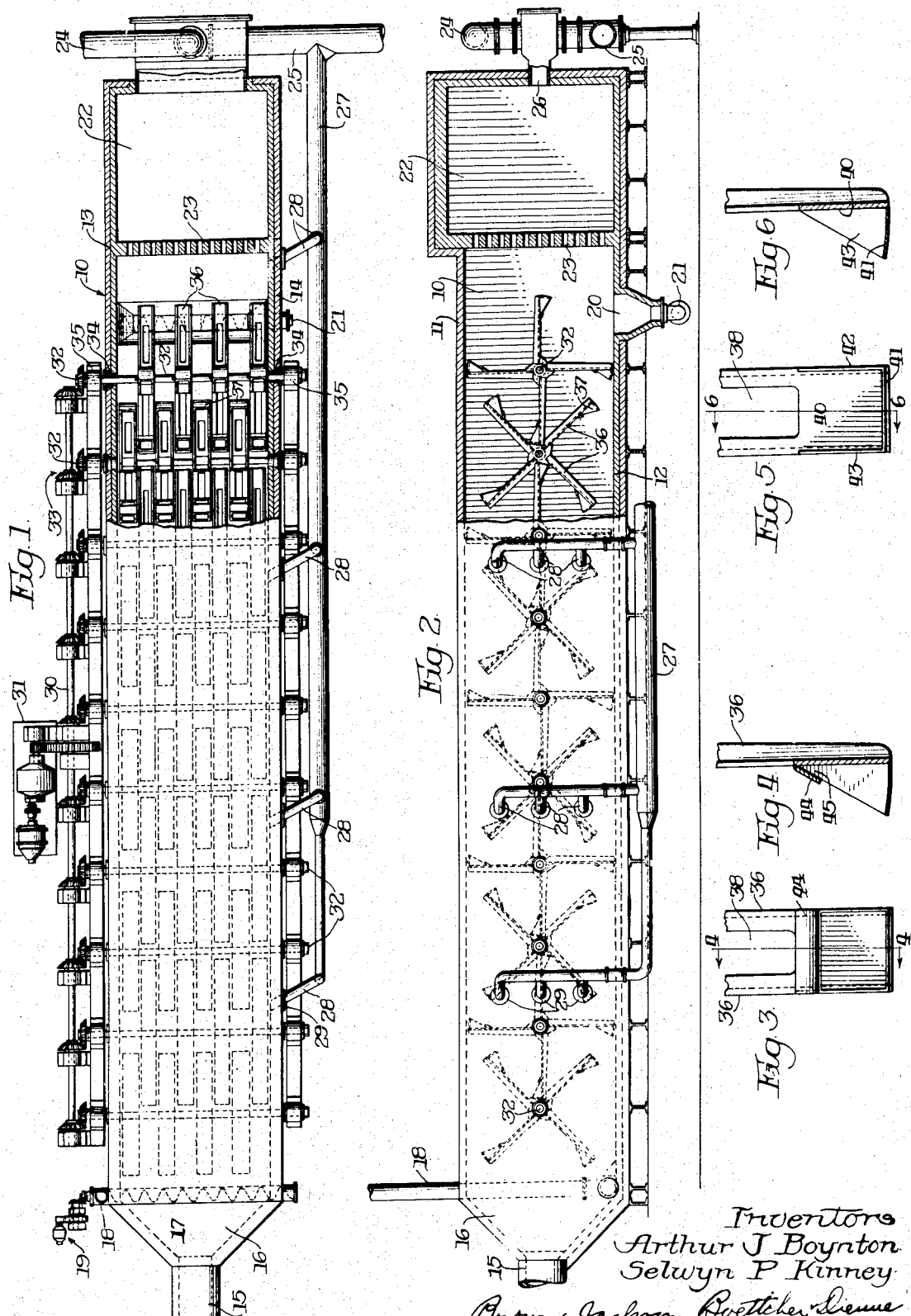

1,906,735

UNITED STATES PATENT OFFICE

ARTHUR J. BOYNTON AND SELWYNE P. KINNEY, OF CHICAGO, ILLINOIS, ASSIGNORS TO BRADLEY-FITCH CO., OF DULUTH, MINNESOTA, A CORPORATION OF MINNESOTA

TREATING CHAMBER

Application filed October 17, 1929. Serial No. 400,257.

The present invention relates generally to treating chambers, such as furnaces, driers, and the like, and has particular reference to that class of apparatus in which solid material in the form of powder or small particles or lumps is passed continuously and progressively through a chamber wherein physical or chemical changes are brought about by exposure of the solids to the conditions obtaining in the chamber. Heating, drying, steam-treatment, oxidizing, reducing, calcining, and like operations may be performed.

The invention has particular reference to the construction of the chamber, and the operation thereof, to effect a continuous passage and exposure of the material, and to control the travel and the exposure. The invention aims to provide treating apparatus which furnishes efficient contact between gas and solid.

One object of the invention is the progressive, step-by-step advance of the material by picking up, advancing and dumping the same through a gaseous medium.

Another object of the invention is to control the dumping and the advance by the construction and operation of the apparatus.

Various other objects and advantages of the invention will become apparent to those skilled in the art from the following description of one embodiment of the invention as it may be employed in a reducing roast of certain minerals.

In the accompanying drawing

Fig. 1 is a plan view of a furnace embodying the invention, part being broken away to show the rotor construction.

Fig. 2 is a side elevation of the furnace with a part shown in section.

Fig. 3 is a face view of one form of scoop or bucket carried by a rotor.

Fig. 4 is a side view of the scoop of Fig. 3.

Fig. 5 is a face view of another form of scoop.

Fig. 6 is a side view of the scoop of Fig. 5.

Although we do not consider the invention to be limited to furnacing treatments, the apparatus will hereinafter be referred to as a furnace, and it is to be understood that such reference is merely for convenience in description.

In the drawing there is shown an elongated chamber having a plurality of horizontal axles set therein carrying buckets or scoops which are compactly arranged for picking up solid material from the furnace floor and for dumping it in an advanced position along the floor in the path of other scoops. A feed mechanism is located at one end and a discharge mechanism at the other end. Hot gases are introduced counter-current to the flow of solid, being admitted both at the extreme end and at points along the length of the furnace, as in case controlled heating is desired.

The furnace proper is designated 10 and comprises a rectangular chamber with top 11, floor 12, and side walls 13 and 14, the material, of course, being suitably chosen for the character of treatment. The disclosed embodiment of the invention has a waste gas outlet 15 at the apex of a pyramidal end 16. On the floor at the base of the pyramid 16 there is feeding means for the solid material to be treated. The feeding means in the present instance comprises a worm screw conveyer 17 which carries solid into the furnace, the pyramidal end forcing it forward in the furnace. The conveyer is fed from any suitable source of material such as the conduit 18 extending vertically upwardly alongside the furnace. A motor drive 19 is indicated for operating the conveyer, and this may be speed-controlled to regulate the feed into the furnace.

The opposite end of the furnace has a trap outlet 20 in the floor into which the material falls after treatment. In the bottom of this outlet there is a worm conveyer 21 which removes the solid from the furnace. The discharge end also has a combustion chamber 22 separated from the treating chamber by a perforated wall 23, through which hot gases are distributed over the area of the treating chamber. Gas and air may be used as fuel, air being supplied by line 24 and gas by line 25 to a suitable burner 26. The gas line has a branch conduit 27 running alongside the furnace with suitably spaced tap lines 28 for burners 29 in the side wall of the furnace, for introducing gas. Such gas may be used for its reactive properties, or for producing heat, or for both, making it possible to control temperature along the length of the furnace where that control is desired. Although these lines are referred to as gas lines, because of this description of a furnace, it is to be understood that other reagents may be introduced in a similar manner.

Alongside the wall 13 of the furnace there is a rotary shaft 30 with driving mechanism 31. A plurality of horizontal axles or rotors 32 are spaced in parallel relationship along the length of the furnace, each rotor having a bevelled gear connection 33 with the shaft 30. The rotor axles are suitably packed at 34 in the chamber walls, and bear at 35 outside the chamber by suitable constructions. The rotors are preferably geared for rotation at the same speed and in the same direction, and in construction are generally similar.

Each rotor is provided with means to pick up solid from the chamber floor, to raise the solid as the rotor revolves, and to carry it forward in the furnace, while dumping it in an advanced position. Such pick-up means is here represented as scoops or buckets on arms projecting from the rotor axles, and the point of dumping is in part controlled by the character of the scoop construction. Each rotor 32 has in the present instance four sets of arms 36, there being four arms in a set. Alternate rotors are identical in construction and adjacent rotors have their sets of arms in staggered and overlapped relation, the arms of one set on one rotor moving closely alongside or between arms of an adjacent rotor. Each arm carries a scoop or bucket 37 which extends close to the axle of an adjacent rotor. The arms 36 are preferably bifurcated providing an opening 38 (Fig. 3) through which the material is dumped from the scoop.

The bucket has two forms, one being a slight modification of the other. In Figs. 5 and 6 a simple dumping bucket is shown. In general it has a scoop form with bottom 40, end wall 41 and side walls 42 and 43 which are triangular in shape. The bottom of the scoop is an extension of the arm 36, and material slides from the scoop bottom through the opening 38 as the arm is raised. Such a bucket dumps completely prior to reaching a vertical position, and its full load is only slightly advanced by one rotor.

In Figs. 3 and 4 a modified bucket is shown in which a double-dumping action is effected. By placing a plate 44 across the inner end of the bucket a radially extending pocket 45 is formed opening outwardly. A part of the bucket contents is spilled prior to reaching a vertical position, and a part is held in the pocket until after the arm passes over center and is well on the downward stroke. This type of bucket is more effective in spreading the contents in a thinner stream, and in advancing it further by one rotor.

In operation, solid material is fed into the chamber 10 by conveyer 17 and is forced along the floor into the path of the first rotor 32. The scoops pick up the material and raise it, advance it and spill it through the gas that is present in the chamber. The material falls on the floor and piles up until it comes into the path of the scoops of the next rotor, by which the accumulating material is picked up and again advanced in the same manner until it has traversed the length of the furnace and reaches the outlet 20. By this method the material is fed slowly, progressively and uniformly through the furnace with high degree of exposure to the gas. The furnace floor 12, being flat, will accumulate some material which will remain more or less permanently in the furnace, but the floor may be modified to lessen the accumulation if this is desired or if the accumulation is dentrimental, without in any way departing from this invention.

In practice, the present invention, embodied in a furnace like that above described, may be used for treating minerals, such as iron-manganese ores, which can be heated in the presence of incompletely burned fuel to reduce the oxides to lower and more useful forms, such as manganous oxide, and magnetic iron oxide. In such use of the furnace heat over the entire length may be required, and control of the temperature may be effected by admitting gas at the side burners, with no air or with insufficient air to complete combustion. The major portion of the gas and the heat may be derived from the combustion chamber 23, and the auxiliary side burners may be used only to effect a desired control.

The progress of the material through the furnace may be controlled in part by the rate of feeding into the furnace, in part by the bucket construction, and in part by the speed of operating the rotors, and it is to be understood that these may be readily balanced by those skilled in the art to meet the instant demands.

The present invention has the advantage that a highly efficient contact between gas and solid is effected, that the path through the furnace is a vertical zig-zag path, that the power requirements are low, and that control of the progress is easily effected, as well as control of the conditions that are to be maintained within the chamber.

It is to be understood that the present invention is not to be considered as limited to and by the description of the apparatus shown in the drawing, and that the various features of the apparatus may be otherwise embodied and modified within the scope of the invention as expressed in the appended claims.

We claim:

1. Apparatus for treating solid material comprising in combination means forming an elongated chamber, a plurality of parallel horizontal rotor axles in said chamber extending transversely thereof and alined lengthwise of the chamber, scoops associated with each rotor, supporting means extending from each axle and carrying said scoops, said supporting means being narrow in width compared to the width of a scoop whereby to provide an unobstructed path for spilling contents from a scoop, means to feed solid material into the chamber into the path of scoops on a rotor, means to turn the rotors in a direction to pick up and to spill said material from one rotor into the path of scoops of another rotor, whereby to advance the material through the chamber, and means to remove solid material which has been advanced through the chamber.

2. Apparatus for treating solid material comprising in combination means forming an elongated chamber, a plurality of parallel horizontal rotors in said chamber extending transversely thereof and alined lengthwise of the chamber, narrow arms on each rotor, scoops wider than said arms and carried by the ends of said arms, the arms and scoops of adjacent rotors being intermeshed so that in rotation of the rotors the scoops and arms freely pass each other, means to feed solid material into the path of scoops on one rotor, means to turn the rotors in a direction to pick up and to spill said material from one rotor into the path of scoops of another rotor, whereby to advance the material through the chamber, and means to remove solid material which has been advanced through the chamber.

3. Apparatus for treating solid material comprising in combination means forming an elongated chamber, a plurality of parallel horizontal rotors in said chamber extending transversely thereof and alined lengthwise of the chamber, a plurality of sets of arms on each rotor, the sets of arms on adjacent rotors being relatively staggered and overlapped, scoops on the arms, means to feed solid material into the chamber into the path of scoops on a rotor, means to turn the rotors in a direction to pick up and to spill said material from one rotor into the path of scoops of another rotor, whereby to advance the material through said chamber, and means to remove solid material which has been advanced through the chamber.

4. Apparatus for treating solid material comprising in combination means forming an elongated chamber, a plurality of parallel horizontal rotors in said chamber extending transversely thereof and alined lengthwise of the chamber, a plurality of sets of peripherally arranged scoops on each rotor, the sets of scoops on adjacent rotors being relatively staggered and overlapped, means to feed material into the chamber into the path of scoops on a rotor, means to turn the rotors in a direction to pick up and to spill said material from one rotor into the path of scoops of another rotor, whereby to advance the material through the chamber, and means to remove solid material which has been advanced through the chamber.

5. In apparatus of the class described a horizontal rotor, a plurality of arms on the rotor, a scoop on each arm adapted to pick up solid material in the path of the revolving scoop, means forming in said scoop a radially directed pocket opening outwardly, whereby in vertical raised position and in positions beyond center material in the scoop is held against spilling.

6. In apparatus of the class described a horizontal rotor, a plurality of scoops on said rotor arranged peripherally, means forming in a scoop a radially directed pocket opening outwardly, whereby in vertical position and in positions beyond center, material in the scoop is held against spilling.

7. In apparatus of the class described two adjacent parallel horizontal rotor axles, spaced series of scoops carried by each of said axles in extended position and arranged peripherally, the two series on said axles being staggered and interfitting, the paths of the scoops on each rotor overlapping the adjacent paths of scoops on the other rotor and extending close to the axle of the other rotor, and means to drive the two rotors in the same direction.

In witness whereof, we hereunto subscribe our names this 30th day of September 1929.

ARTHUR J. BOYNTON.
SELWYNE P. KINNEY.